(12) United States Patent
Matzenmüller et al.

(10) Patent No.: US 7,636,992 B2
(45) Date of Patent: Dec. 29, 2009

(54) STARTING AND STOPPING CONTINUOUS-FEED THERMOMOLDING MACHINE

(75) Inventors: Jürgen Matzenmüller, Bellamont (DE); Wolfgang Grube, Biberach (DE)

(73) Assignee: Uhlmann PAC-Systeme GmbH & Co. KG, Laupheim (DE)

( * ) Notice: Subject to any disclaimer, the term of this patent is extended or adjusted under 35 U.S.C. 154(b) by 870 days.

(21) Appl. No.: 11/244,755

(22) Filed: Oct. 6, 2005

(65) Prior Publication Data

US 2006/0076701 A1   Apr. 13, 2006

(30) Foreign Application Priority Data

Oct. 9, 2004   (DE) .................... 10 2004 049 267

(51) Int. Cl.
*B21D 33/00* (2006.01)
(52) U.S. Cl. ................ 29/17.1; 29/17.2; 110/186; 110/191; 432/8; 432/10; 432/11; 392/417; 250/515.1
(58) Field of Classification Search .............. 29/17.1, 29/17.2, 709; 110/186, 191; 432/8, 10, 11, 432/12, 52, 253; 392/407, 417; 219/645; 250/515.1
See application file for complete search history.

(56) References Cited

U.S. PATENT DOCUMENTS

| 4,209,957 A | 7/1980 | Utzmann |
| 4,883,419 A | 11/1989 | Queirel .................... 425/326.1 |
| 5,647,923 A * | 7/1997 | Buescher .................... 148/672 |

FOREIGN PATENT DOCUMENTS

| DE | 1145784 | 3/1963 |
| DE | 2745422 | 4/1978 |
| DE | 3234506 | 3/1984 |
| DE | 198 50 143 | 5/2000 |

* cited by examiner

*Primary Examiner*—Jermie E Cozart
(74) *Attorney, Agent, or Firm*—Andrew Wilford

(57) ABSTRACT

In a continuous-feed thermomolding machine a foil is advanced in a transport direction at a constant travel speed through a heat station where it is exposed to a heat source such that each piece of the foil is exposed for a predetermined residence time. When the machine is stopped, a shield is positioned in the station between the foil and the source so that substantially no heat is imparted to the foil from the source. The machine is started by accelerating the foil to the travel speed while simultaneously and synchronously accelerating the shield opposite to the travel direction such that, as the shield fully retracts from the station, the foil reaches the travel speed and, before the shield has fully retracted from the station, every piece of the foil in the station exposed by the retracting shield is exposed to the source for the residence time.

12 Claims, 3 Drawing Sheets

STARTING AND STOPPING CONTINUOUS-FEED THERMOMOLDING MACHINE

FIELD OF THE INVENTION

The present invention relates to a method of starting and stopping a thermomolding machine. More particularly this invention concerns such a method applied to a continuous-feed thermomolding machine.

BACKGROUND OF THE INVENTION

In a standard batch-type prior-art thermomolding machine of the type described in U.S. Pat. No. 4,209,957 of Utzmann the foil is fed to a molding station that forms blisters in the foil that are filled in a succeeding filling station and then closed with a seal foil in a succeeding sealing station. The molding station is as a rule immediately downstream of a heating station in which the foil is warmed up to the temperature necessary for the formation of blisters, typically in a deep-drawing process. The heating can be done by contact with a heated platen or in a contact-free manner by passing the foil at a spacing past heaters in the heating station, a shield plate being movable between the heater elements and the foil to stop the heating. Such a machine is relatively easy to start and stop. Sections of the foil are heated in the heating station while stationary and then are shifted into the molding station where the shaping step takes place on, once again, a stationary workpiece. As the batchwise thermomolding machine is stopped and started a shield plate is moved into and out of the heating station to expose the foil, as needed, to the heat source.

This method is not applicable to a continuous-feed thermomolding machine, mainly because there is no cycling so that the foil pieces are continuously moving through the heating station. A piece that is insufficiently heated cannot be molded properly, so that at the start of operation the first few batches are unusable. In addition when a continuous-feed machine is stopped the foil piece in the heating station will cool off and will not have the required temperature when the machine is restarted.

German 198 50 143 of Bar and Gaus describes an apparatus for laminating together two workpieces, namely a glue layer and a seal. The two workpieces are heated with near infrared (NIR) emitters and their temperatures are monitored by pyrometers. This reference suggests that the NIR radiation be started and stopped in fractional seconds by the use of shutters, but this reference does not say how to avoid rejects with continuously moving workpieces and how to get the workpieces up to molding temperature when the machine is started.

OBJECTS OF THE INVENTION

It is therefore an object of the present invention to provide an improved starting and stopping a continuous-feed thermomolding machine.

Another object is the provision of such an improved starting and stopping a continuous-feed thermomolding machine that overcomes the above-given disadvantages, in particular that allows the machine to be stopped and started without any significant waste of material, that is where the last piece that moves out of the heating station before the machine is stopped is perfectly heated and the first piece moving out after the machine is restarted is also perfectly heated.

SUMMARY OF THE INVENTION

In a continuous-feed thermomolding machine during normal operation a foil is advanced in a transport direction at a substantially constant travel speed through a heat station where it is exposed to a heat source such that each piece of the foil is exposed in the station for a predetermined residence time that is a direct function of the parameters of travel speed, heat output of the source, and length in the direction of the station. When the machine is stopped a shield is positioned so that it is stationary and extends the length of the station between the foil and the source so that substantially no heat is imparted to the foil from the source. The machine is started by accelerating the foil to the travel speed while simultaneously and synchronously accelerating the shield opposite to the travel direction such that, as the shield fully retracts from the station, the foil reaches the travel speed and, before the shield has fully retracted from the station, every piece of the foil in the station exposed by the retracting shield is exposed to the source for the residence time.

Thus with this system the very first bit of the foil that exits the heating station as the machine is started will have been heated for the desired residence time to the desired output temperature. There will be no significant waste.

According to the invention the shield starts accelerating before the foil starts accelerating. More particularly a time offset between when the shield starts accelerating and the foil starts accelerating is substantially equal to the residence time. This ensures that the furthest downstream portion of the foil in the station is heated for the residence time, before it starts moving out.

According to a further feature of the invention, the foil is heated radiantly, preferably by NIR radiation. In addition, while the foil is stopped, a heat output of the source is substantially reduced. Furthermore according to the invention, shortly before the foil starts accelerating, the heat output is increased to a nominal level at which it is maintained during normal running. These steps ensure that energy is saved and it is not necessary to provide a complex cooling system for the heating station.

To make sure that the temperature of the foil is exactly what is needed for the subsequent molding step, the temperature of the foil is detected immediately downstream in the direction from the heating station and controlling at least one of the parameters in accordance with the detected temperature. This can be done by a pyrometer in conjunction with a feedback-type controller coupled to a variable-speed drive for the foil and/or an energizing circuit for the heat source. Thus when the foil is too hot, it can be slowed down or the output of the heat source can be reduced somewhat.

According to a further feature of the invention, in order to shut down the thermomolding machine, the foil is decelerated from the travel speed to a full stop while simultaneously advancing the shield in the travel direction from an upstream position outside station to a downstream position extending all the way through the station between the foil and the source with a speed synchronous to the speed of the foil as it decelerates so that the shield enters the station at the travel speed and stops moving as the foil stops moving.

More particularly, immediately prior to shutting down the thermomolding machine, the shield is accelerated upstream of the station to the travel speed. The shield therefore enters the station moving synchronously with the foil. The deceleration of the foil is started when the last part of the foil to be thermomolded has left the station.

Thus with the stopping method of this invention, every bit of the foil that leaves the heating station is heated to the desired molding temperature. The foil left sitting in the station is not heated at all so that it will not be damaged, and is only heated as described above when the machine is restarted.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
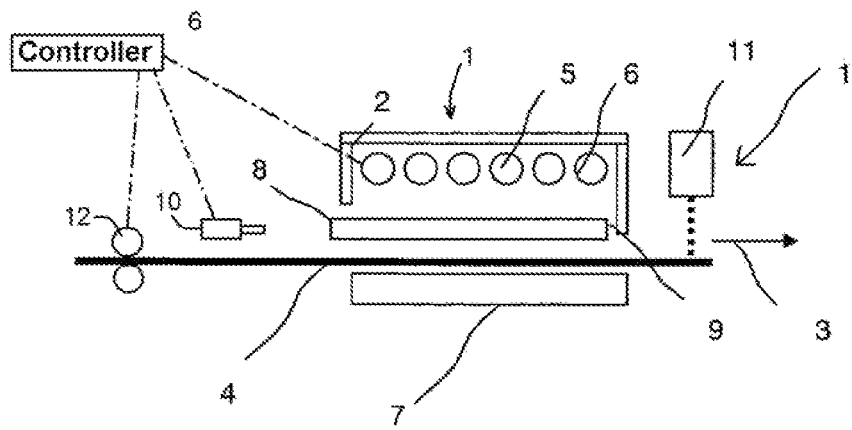
FIGS. 1, 2, and 3 are side schematic views illustrating the method of this invention respectively when stopped, when moving from stopped to the continuous-feed mode, and when in continuous-feed mode.
Figure 2:
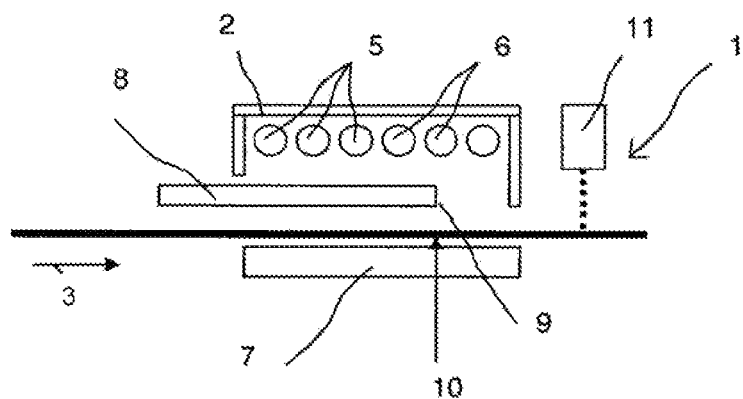
Figure 3:
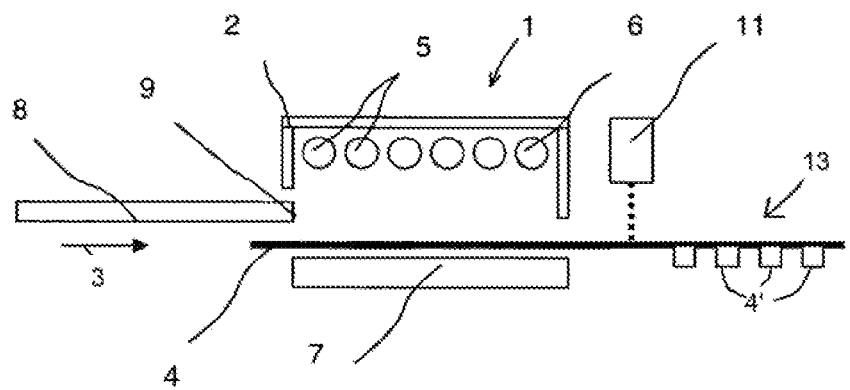

As seen in FIGS. 1 to 3, a thermomolding machine has a heating station 1 to which a thermoplastic foil workpiece 4 is fed in a direction 3 by a drive indicated schematically at 12 and operated by a controller 6. The heating station 1 has a downwardly open hood or housing 2 provided with a row of NIR emitters 5 constituting a heat source and serving to heat the foil 4. A stationary reflector 7 is provided underneath the station 1 and underneath the foil 4. Downstream of the heating station 1 is a molding station 13 (FIG. 3 only) where blisters or pockets 4' are formed in the foil 4, and between the stations 1 and 13 is a heat sensor or pyrometer 11 that is connected to the controller 6.

A shield plate 8 is movable by an actuator 10 also operated by the controller 6 from a downstream blocking position shown in FIG. 1 with its downstream end 9 at the downstream end of the housing 2 to an upstream exposing position shown in FIG. 3 with its downstream end 9 at or upstream of the upstream end of the housing 2. In the FIG. 1 blocking position, the foil 4 is not heated by the source emitters 5 while in the exposed position, the radiation from the emitters 5 falls directly on the foil 4.

During normal continuous-feed operation as shown in FIG. 3 the foil 4 moves continuously at a constant speed or velocity V in the direction 3 and the heat emitters 5 are operating at their standard nominal output. Thus every piece of the foil 4 will have a residence time D in the heat station 1 that is a direct function of the velocity V and a length L in the direction of the station 1. Since the heat output of the source 5 is constant, this will ensure that every piece of the foil 4 is heated identically. The pyrometer 11 can vary the speed V and/or the output of the source 5 to fine-tune the heating by feeding an output representing the actual temperature of the foil 4 as it exits the station 1 to the controller 6 so that this controller 6 can make the necessary adjustments.

Figure 4:
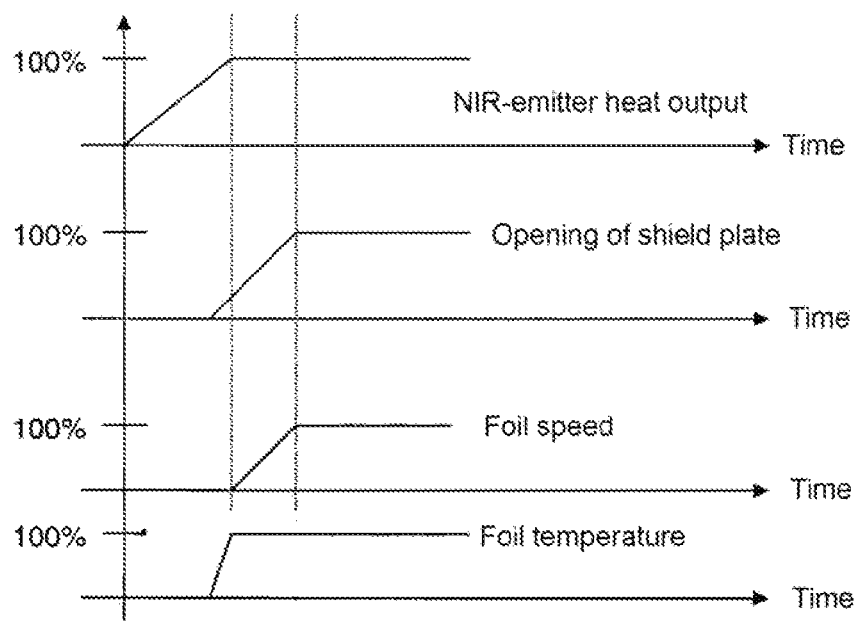
FIGS. 4, 5, and 6 are graphs illustrating the method of the invention.
Figure 5:
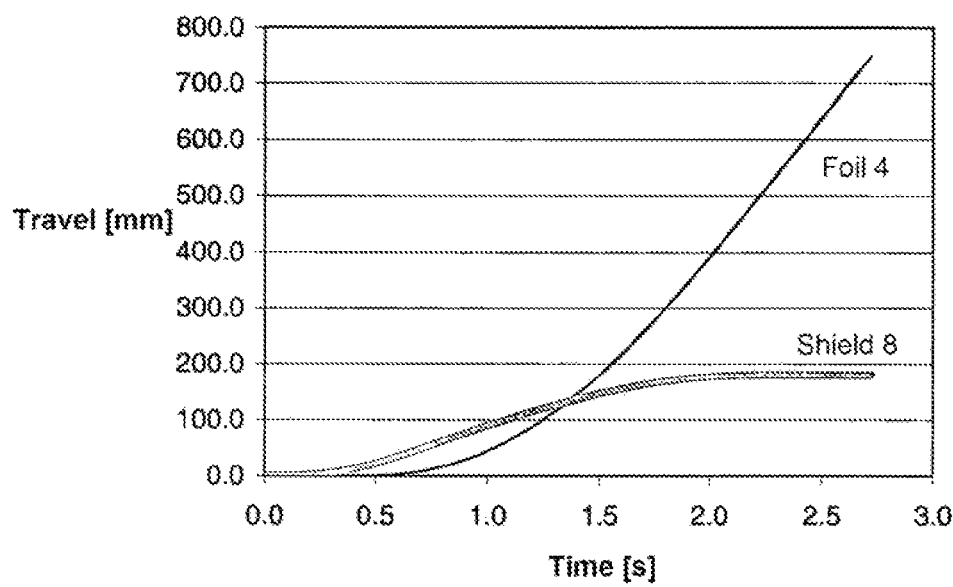
Figure 6:
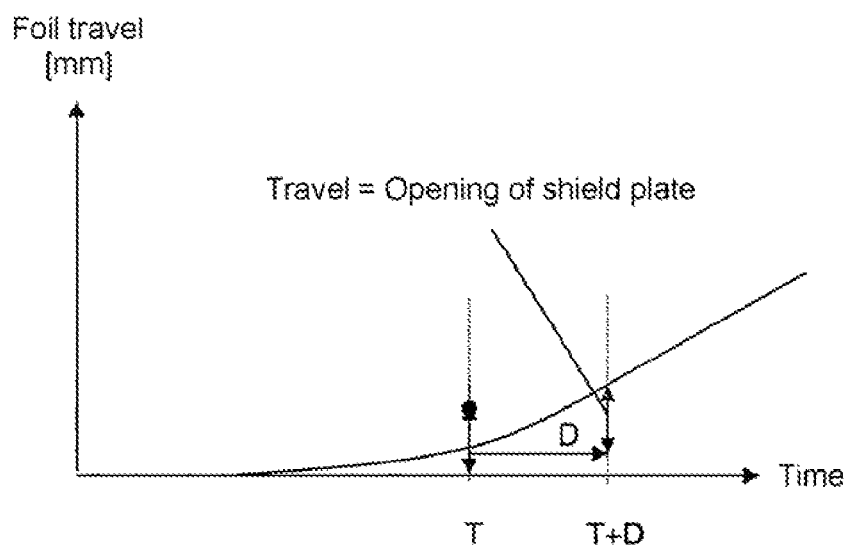

When the machine is stopped as shown in FIG. 1, the foil 4 is not moving in the direction 3, the downstream end 9 of the shield 8 is at the downstream end of the station 1 so as to completely block the underlying foil 4 from the source 5, and the source 5 is either turned off or operating at a very low level. The system is started from this position as illustrated in the graphs of FIGS. 4, 5, and 6 by first ramping up the source 5 to its nominal output (see FIG. 4). Slightly before this nominal heating level is attained the controller 6 starts, in fact the desired residence time D before, retraction of the shield plate 8 commences. Exactly when the nominal heating level is obtained and after the start of the retraction of the plate 8, the foil 4 starts to move and is accelerated up to its nominal travel speed V. This speed V is reached exactly when the shield plate 8 retracts fully from the station 1.

With this method, therefore, the tiny portion of the foil 4 at the extreme downstream end of the station 1 will be exposed to the full heat of the source 5 for the desired residence time D and, as the shield 8 retracts synchronously with acceleration of the foil 4 from a full stop, every portion of the foil 4 will be exposed to this heat for the exact residence time D. Such operation ensures that on startup the only portion of the foil 4 that is not usable will be that small piece between the heating station 1 and the shaping station 13.

FIG. 6 shows the travel of the foil 4 relative to time and the position of the shield plate 8. At a point T in time the residence time D extends on the time axis toward the right and produces the vertical offset to the foil-movement curve after the residence time D. This offset corresponds to the opening of the shield plate 8 at time T so that the movement of the shield plate 8 can in theory be set the same as the acceleration of the foil 4.

The system is stopped by bringing the shield 8 outside the station 1 into motion in the direction 3 at the foil-travel speed V so that, when the shield 8 enters the station 1 it and the foil 4 are moving synchronously. Thereafter both the shield 8 and foil 4 are decelerated synchronously until the shield end 9 reaches the downstream station end and both the shield 8 and foil 4 come to a simultaneous synchronized halt. At this time the output of the source 5 is normally reduced to save energy. Thus every bit of the foil 4 that exits the station 1 before the foil 4 stops moving will be perfectly heated, having been exposed for the desired residence time D in the station 1. The stopped foil 4 in the station 1 will be shielded from the source 5 until the machine is restarted as described above.

We claim:

1. A method of starting a continuous-feed thermomolding machine where during normal operation a foil is advanced in a travel direction at a substantially constant travel speed through a heat station where the foil is exposed to a heat source such that each piece of the foil is exposed in the station for a predetermined residence time that is a direct function of the parameters of travel speed, heat output of the source, and length in the direction of the station, the starting method comprising the steps of:
    while the foil is stopped, positioning a shield so that it is stationary and extends the length of the station between the foil and the source, whereby substantially no heat is imparted to the foil from the source; and thereafter
    accelerating the foil to the travel speed while simultaneously and synchronously accelerating the shield opposite to the travel direction such that, as the shield fully retracts from the station, the foil reaches the travel speed and, before the shield has fully retracted from the station, every piece of the foil in the station exposed by the retracting shield is exposed to the source for the residence time.

2. The thermomolding method defined in claim 1 wherein the shield starts accelerating before the foil starts accelerating.

3. The thermomolding method defined in claim 2 wherein a time offset between when the shield starts accelerating and the foil starts accelerating is substantially equal to the residence time.

4. The thermomolding method defined in claim 1 wherein the foil is heated radiantly.

5. The thermomolding method defined in claim 4 wherein the foil is heated by near-infrared radiation.

6. The thermomolding method defined in claim 1, further comprising the step while the foil is stopped of:
    substantially reducing a heat output of the source.

7. The thermomolding method defined in claim 6, further comprising the step, shortly before the foil starts accelerating of:

increasing the heat output to a nominal level and maintaining the heat at the nominal level during normal running.

8. The thermomolding method defined in claim 1, further comprising the step of:

detecting the temperature of the foil immediately downstream in the direction from the heating station and controlling at least one of the parameters in accordance with the detected temperature.

9. The thermomolding method defined in claim 1, further comprising in order to shut down the thermomolding machine the steps of:

decelerating the foil from the travel speed to a full stop while simultaneously advancing the shield in the travel direction from an upstream position outside station to a downstream position extending all the way through the station between the foil and the source with a speed synchronous to the speed of the foil as it decelerates, whereby the shield enters the station at the travel speed and stops moving as the foil stops moving.

10. The thermomolding method defined in claim 9, further comprising the step immediately prior to shutting down the thermomolding machine of:

accelerating the shield upstream of the station to the travel speed.

11. The thermomolding method defined in claim 9 wherein the deceleration of the foil is started when the last part of the foil to be thermomolded has left the station.

12. A method of stopping a thermomolding machine wherein during normal operation a foil is advanced in a substantially constant travel direction at a substantially constant travel speed through a heat station where the foil is exposed to a heat source such that each piece of the foil is exposed in the station for a predetermined residence time that is a direct function of the parameters of travel speed, heat generated by the source, and length in the direction of the station, the starting method comprising the steps of:

decelerating the foil from the travel speed to a full stop while simultaneously advancing the shield in the travel direction from an upstream position outside station to a downstream position extending all the way through the station between the foil and the source with a speed synchronous to the speed of the foil as it decelerates, whereby the shield enters the station at the travel speed and stops moving as the foil stops moving.

* * * * *